J. R. PERRINE.
FEED GEARING.
APPLICATION FILED JULY 26, 1911.
1,019,914.
Patented Mar. 12, 1912.
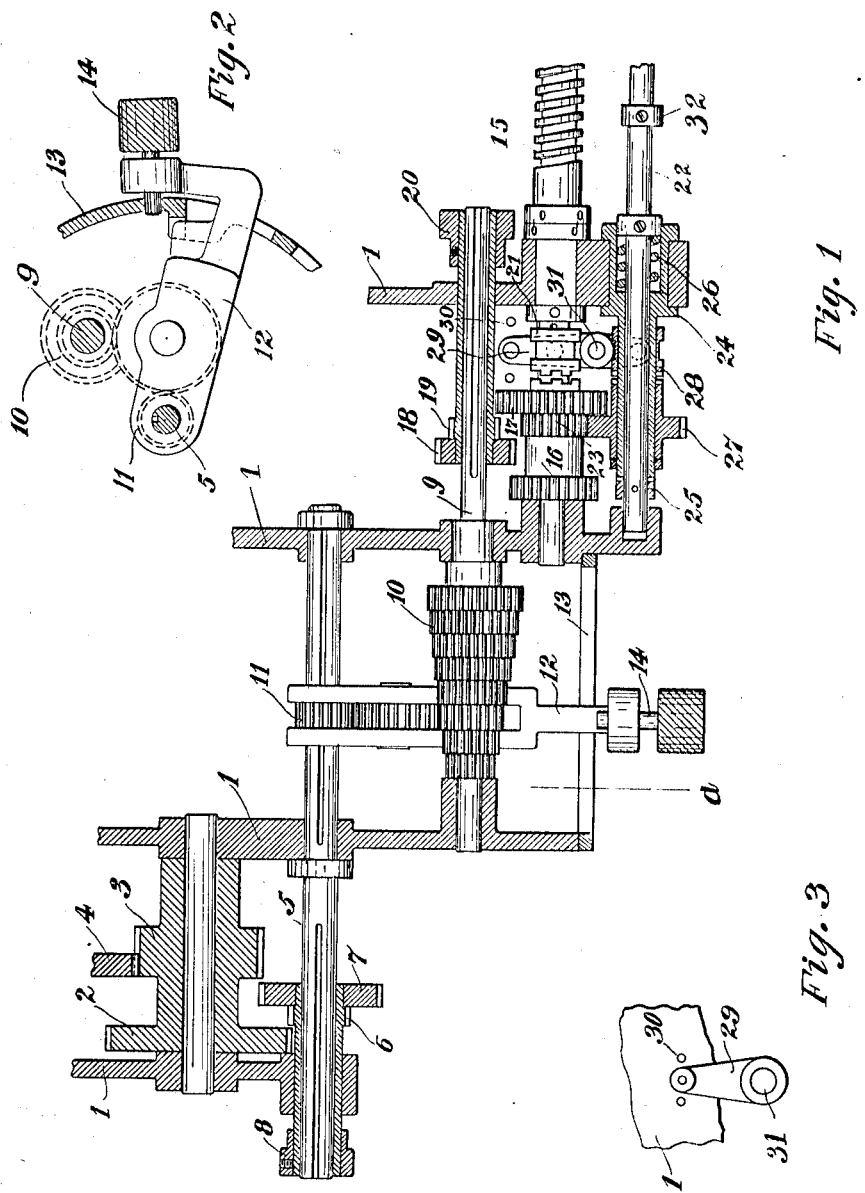
Witnesses
Inventor
John R. Perrine
James W. See
Attorney

UNITED STATES PATENT OFFICE.

JOHN R. PERRINE, OF CINCINNATI, OHIO, ASSIGNOR TO THE CINCINNATI LATHE & TOOL COMPANY, OF CINCINNATI, OHIO.

FEED-GEARING.

1,019,914. Specification of Letters Patent. Patented Mar. 12, 1912.

Application filed July 26, 1911. Serial No. 640,613.

*To all whom it may concern:*

Be it known that I, JOHN R. PERRINE, a citizen of the United States, residing at Cincinnati, Hamilton county, Ohio, have invented certain new and useful Improvements in Feed-Gearing, of which the following is a specification.

This invention pertains to feed gearing such as is employed on engine lathes for securing various rates of carriage-advance in feeding and in screw cutting, and the invention relates to improvements designed to facilitate the convenient getting of a satisfactory number of speed changes for the lead screw and the feed rod.

The invention will be readily understood from the following description taken in connection with the accompanying drawing in which:—

Figure 1 is a horizontal section of a feed gearing exemplifying my invention: Fig. 2 a vertical transverse section of the same in the plane of line *a* of Fig. 1: and Fig. 3 a front elevation of the clutch-throwing lever.

In the drawing:—1, indicates stationary parts of a lathe as usually employed for furnishing bearings for and housing the feed mechanism: 2, a gear transmitting motion to the feed mechanism: 3, a second gear, fast with gear 2, but of less diameter: 4, a gear typifying any usual gear driven by the lathe and serving to transmit rotation to the two gears 2 and 3: 5, a splined tumbler shaft: 6, a pinion splined on shaft 5 and adapted, by sliding, to be engaged with or disengaged from gear 2: 7, a gear fast with gear 6 and adapted to be engaged with or disengaged from gear 3, gears 2 and 3 being so far separated as to permit combined gears 6 and 7 to occupy an idle position between them, as is illustrated in the drawing: 8, a handle by means of which gears 6 and 7 may be slid upon their shaft so as to put these gears in the neutral position indicated or to put gear 6 into engagement with gear 2 or gear 7 into engagement with gear 3: 9, a cone-gear shaft parallel with shaft 5: 10, a cone of gears fast on shaft 9: 11, a pinion splined on shaft 5: 12, a tumbler pivoted on shaft 5 and straddling pinion 11 and carrying an intermediate gear meshing with pinion 11 and adapted, by proper sidewise and angular adjustment of the tumbler to put the intermediate gear in mesh with any one of the gears 10: 13, a stationary slotted faceplate through which the tumbler projects: 14, a detent pin to engage index holes in the faceplate and support the tumbler in adjusted sidewise and angular position, the cone-gear tumbler and detent mechanism being as is usual in this class of gearing: 15, the lead-screw of the lathe: 16, a gear loose on the lead-screw: 17, a second gear loose on the lead-screw and fast with gear 16: 18, a gear splined on cone-gear shaft 9 and adapted to be engaged with and disengaged from gear 16: 19, a second gear splined on shaft 9 and fast with gear 18 and adapted to be engaged with and disengaged from gear 17, the distance between gears 16 and 17 being such as to permit gears 18 and 19 to occupy an unengaged position between them, as indicated in the drawing: 20, a handle by means of which gears 18 and 19 can be slid into and out of engagement with their mating gears: 21, a clutch member splined on the lead-screw and adapted to engage a clutch on the hub of gear 17: 22, the usual feed-rod of the lathe: 23, a gear fast with gears 16 and 17 and, like them, loose on the lead-screw: 24, a rotary sleeve loose on feed-rod 22 and collared against endwise movement: 25, a clutch-part fast on feed rod 22 and adapted to engage a corresponding clutch-part on the end of sleeve 24: 26, a spring engaging between sleeve 24 and a collar on feed rod 22 and tending to hold the feed rod to the right with clutch 25 in engagement with the sleeve: 27, a gear loose on sleeve 24 and engaging gear 23, the hub of this gear forming a clutch-member: 28, a clutch-member splined on sleeve 24 and adapted to lock gear 27 to the sleeve: 29, a clutch-throwing arm connected with clutches 21 and 28 and adapted to throw those clutches, alternatively, into engagement with their respective gears 17 and 27: 30, detent holes for arm 29, adapted to lock that arm in the neutral position indicated or in either of the two positions corresponding with the engagement of one of the clutches: 31, the pivot-shaft of the clutch-throwing arm: and 32, a stop-collar mounted for endwise adjustment on feed-rod 22.

So far as the feed mechanism is concerned gear 4 is the prime mover and when the parts are in the position indicated in Fig. 1 no movement will be transmitted to the feed gear. By means of handle 8 the combined gears 6 and 7 may be shifted so that splined shaft 5 may be driven at high speed through the medium of gears 2 and 6 or at low speed through the medium of gears 3 and 7. By properly shifting the tumbler, in an obvious manner, cone-gear shaft 9 may be driven at various speeds relative to that of shaft 5.

Assuming shaft 9 to be in rotation at some speed, determined by the adjustment which has been made at handle 8 and at the tumbler, no motion will be transmitted to either the lead-screw or the feed-rod, the gears on shaft 9 and the lead screw being disengaged. If, now, handle 20 be shifted to the left, motion at a certain rate will be transmitted to the group of gears 16, 17 and 23, through the medium of gear 18, or if the handle be shifted to the right a slow motion will be transmitted to that group of gears through the medium of gear 19. Assume, now, that the group of gears 16, 17 and 23 is in rotation at a rate of speed dependent upon the adjustment of handle 20. If clutch 21 be now thrown to the left it will lock that group of gears to the lead-screw and will give to the lead-screw a speed of rotation dependent upon the adjustment of handle 20, tumbler 12 and handle 8 thus providing for the lead-screw a selection of thirty-two rates of rotation relative to that of prime-moving gear 4. The lead-screw being employed for screw cutting the arrangement described provides for a very considerable range in the choice of thread pitches without loss due to duplicating rates of speed, that is to say, each of the thirty-two selections of speed provided for may be useful speeds, no two of which are duplicates.

Assume, now, that a group of gears on the lead screw is in rotation at some selected speed and that clutch 21 is in the disengaged position indicated. Gear 27 on the sleeve of the feed rod will be turning at a rate according to the selection which has been made but the feed-rod will be idle owing to the fact that its clutch 28 is disengaged. If, now, clutch 28 be thrown to the left gear 27 will become locked to sleeve 24, and the sleeve is normally locked to the feed-rod by means of clutch 25, therefore the feed rod will be put into rotation at selected rate of speed and there will be, as in the case of the lead-screw, thirty-two different useful rates of speed to select from. As is usual in engine lathes the feed rod has very much less advancing effect upon the lathe carriage than the lead-screw would have turning at the same rate of speed, and it is therefore of the utmost importance that the feed rod and lead-screw be not in rotation simultaneously. The arrangement of the two clutches in connection with their common lever is such that while either the lead-screw or the feed rod may be given rotation both cannot be driven at one time as one of the clutches must go out of engagement before the other goes into engagement.

Stop-collar 32 on the feed-rod is adapted to be engaged by the lathe carriage in moving to the left and this collar may be adjusted to any desired point along the length of the feed rod so that the carriage may engage it at any point in its leftward advance where it is desired to have the feeding arrested. Assume that parts are in the condition illustrated in Fig. 1 except that clutch 28 is engaged so that the feed-rod is in rotation and effecting the feeding of the carriage to the left, and assume that stop-collar 32 is in a position to be engaged by the lathe carriage when the feeding has been carried to the desired point of cessation. The carriage, in moving to the left after it has engaged the stop-collar, pushes the feed rod to the left and disengages clutch 25, whereupon the feed rod comes to rest. When the carriage is later shifted to the right the feed rod automatically moves to the right, under the influence of spring 26, and clutch 25 reëngages so that the feed rod is again in rotation ready for further feeding operations.

I claim :—

1. Feed gearing comprising, a lead-screw, a first splined shaft, a cone of gears on the first splined shaft, a second splined shaft, a pinion splined on the second splined shaft, a tumbler engaging the second splined shaft and said pinion, an intermediate gear carried by the tumbler and engaging said pinion and adapted to engage any selected gear of the cone of gears, a pair of diversely sized gears fast to each other loose on the lead-screw, a pair of gears splined on the first-mentioned splined shaft and adapted to engage one or the other of the diversely sized gears on the lead-screw, and a clutch adapted to engage the lead-screw with the pair of diversely sized gears thereon, combined substantially as set forth.

2. Feed gearing comprising, a feed-rod, a first splined shaft, a cone of gears on the first splined shaft, a second splined shaft, a pinion splined on the second splined shaft, a tumbler engaging the second splined shaft and said pinion, an intermediate gear carried by the tumbler and engaging said pinion and adapted to engage any selected gear of the cone of gears, a gear loose on the feed-rod, a clutch adapted to lock the feed-rod to the gear thereon, a pair of diversely sized gears mounted for rotation between the feed-rod and the first splined shaft, a pair of gears splined on the first-mentioned splined shaft and adapted to engage one or the other of said diversely sized gears, and a gear fast with said pair of diversely sized gears and engaging the gear on the feed-rod, combined substantially as set forth.

3. Feed gearing comprising, a lead-screw, a first splined shaft, a cone of gears on the first splined shaft, a second splined shaft, a pinion splined on the second splined shaft, a tumbler engaging the second splined shaft and said pinion, an intermediate gear carried by the tumbler and engaging said pinion and adapted to engage any selected gear of the cone of gears, a pair of diversely sized gears loose on the lead-screw, a pair of gears splined on the first-mentioned splined shaft and adapted to engage one or the other of the diversely sized gears on the lead-screw, a clutch adapted to engage the lead-screw with the diversely sized gears thereon, a feed-rod, a gear loose on the feed-rod, a gear fast with the gears on the lead-screw and engaging the gear on the feed-rod, and a clutch adapted to lock the feed-rod to the gear thereon, combined substantially as set forth.

4. Feed gearing comprising, a lead-screw, a first splined shaft, a cone of gears on the first splined shaft, a second splined shaft, a pinion splined on the second splined shaft, a tumbler engaging the second splined shaft and said pinion, an intermediate gear carried by the tumbler and engaging said pinion and adapted to engage any selected gear of the cone of gears, a pair of diversely sized gears loose on the lead-screw, a pair of gears splined on the first-mentioned splined shaft and adapted to engage one or the other of the diversely sized gears on the lead-screw, a clutch adapted to engage the lead-screw with the diversely sized gears thereon, a feed-rod, a gear loose on the feed-rod, a gear fast with the gears on the lead-screw and engaging the gear on the feed-rod, a clutch adapted to lock the feed-rod to the gear thereon, and a double-armed lever engaging said two clutches and serving to release one of the clutches when the other clutch is engaged, combined substantially as set forth.

5. Feed gearing comprising, a feed-rod adapted for rotary and endwise motion, a gear loose on the feed-rod, selective speed gearing for turning said gear, a clutch carried by the feed-rod and serving to lock the feed-rod to the gear thereon, a spring urging the feed-rod endwise and holding said clutch normally in engagement, and a stop-collar adjustable lengthwise of the feed-rod and adapted to be engaged by a lathe carriage, combined substantially as set forth.

JOHN R. PERRINE.

Witnesses:
W. C. HEINDEL,
L. F. RATTERMAN.

---

Copies of this patent may be obtained for five cents each, by addressing the "Commissioner of Patents, Washington, D. C."